Figure 1:
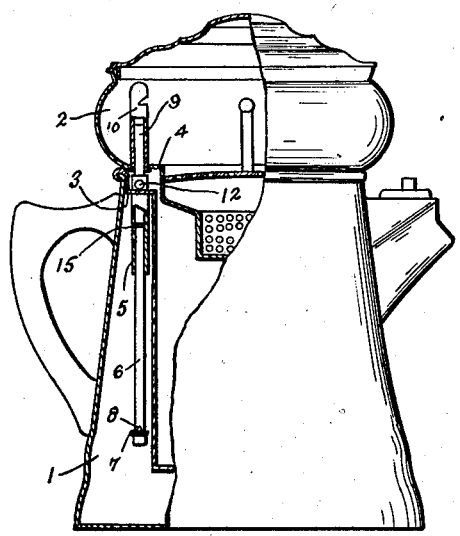

May 24, 1932. S. A. HAINES 1,860,094

FLUID TRANSMITTING MEANS FOR COOKING AND BREWING UTENSILS

Filed April 14, 1930

INVENTOR.
Stacey A. Haines
BY
Fay Oberlin & Fay
ATTORNEYS.

Patented May 24, 1932

1,860,094

UNITED STATES PATENT OFFICE

STACEY A. HAINES, OF KANSAS CITY, MISSOURI, ASSIGNOR OF ONE-HALF TO HAROLD F. SPENCER, OF KANSAS CITY, MISSOURI

FLUID-TRANSMITTING MEANS FOR COOKING AND BREWING UTENSILS

Application filed April 14, 1930. Serial No. 444,157.

This invention, relating as indicated to fluid transmitting means for cooking and brewing utensils, has specific reference to a form of construction of such transmitting means which shall be adaptable to be used in connection with utensils having a plurality of chambers for the purpose of transferring variable portions of the contents of one of such chambers to another.

The device comprising my invention is applicable to plural chambered utensils in which, during the course of the cooking or brewing process, a definite quantity of fluid, such as boiling water, is to be transferred from the boiling chamber of such utensil to the infusion chamber thereof, wherein the food or other material is to be cooked or brewed. This fluid transmitting or delivery device is applicable to utensils which operate on the thermosiphon principle for effecting the transfer of fluid, as well as to such utensils which rely upon steam pressure generated in the boiling chamber thereof for forcing the liquid from such chamber to another.

In order that a fluid delivery device be useable to the greatest advantage it is necessary that such means be capable of adjustment in order that a variable predetermined quantity of liquid will be transferred during the cooking or brewing process. A further requirement for such delivery means is simplicity of construction so that the cost of manufacture thereof will be reduced to a minimum and further, that the cooperating parts be so constructed as to be useable in the hands of an inexperienced operator. The delivery means shall have the further advantage that an adjustment thereof to transfer the desired quantity of fluid can be made quickly and easily and also that when such adjustment is made there will be no change in the setting during the operation of the device of which it is a part, inasmuch as the particular foods or like materials which are to be cooked or brewed require specific amounts of fluid for best results.

It is among the objects of my invention to provide a fluid delivery or transmitting means which shall have all of the above named desirable characteristics. Other objects of my invention will appear as the description proceeds.

To the accomplishment of the foregoing and related ends, said invention, then, consists of the means hereinafter fully described and particularly pointed out in the claims; the annexed drawings and the following description setting forth in detail certain mechanism embodying the invention, such disclosed means constituting, however, but one of various mechanical forms in which the principle of the invention may be used.

In said annexed drawings:—

Figure 2:
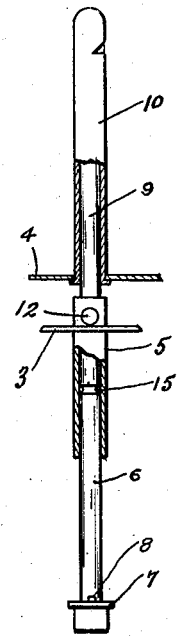
Figure 3:
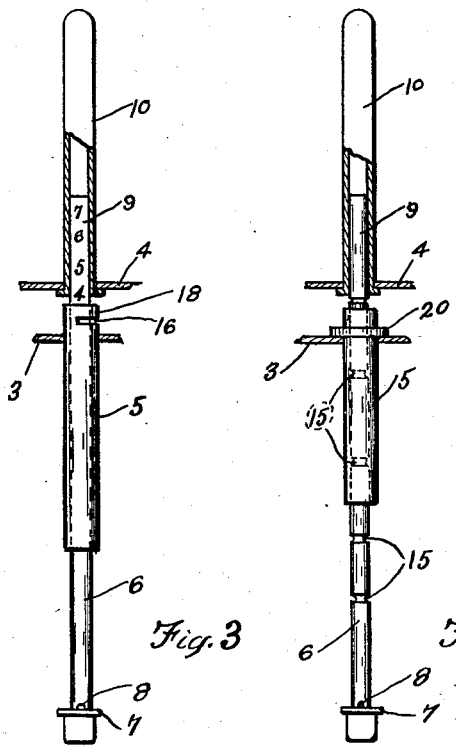
Figure 4:
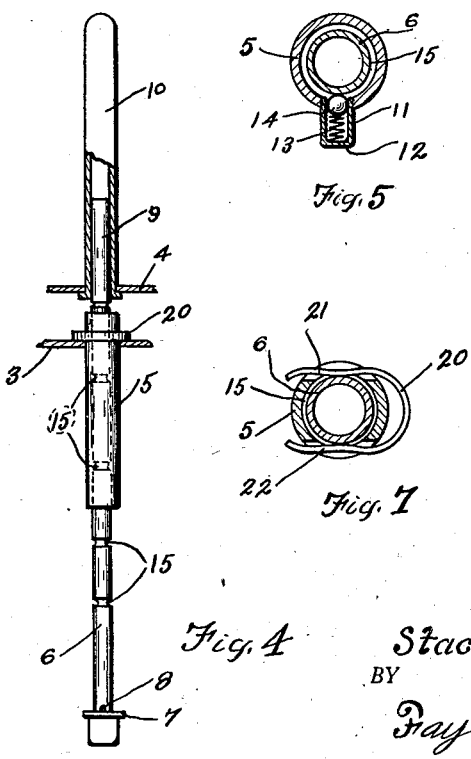
Figure 5:
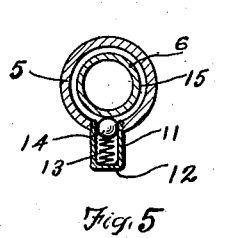
Figure 6:
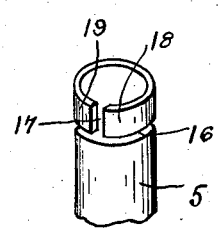
Figure 7:
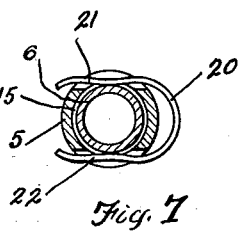

Fig. 1 is a broken elevational view of a utensil, specifically a beverage brewing device showing associated therewith the device comprising my invention; Fig. 2 is an enlarged part sectional, part elevational view of the fluid delivery device illustrated in Fig. 1; Figs. 3 and 4 are respectively alternative forms of construction of the structure disclosed in Fig. 2; and Figs. 5, 6 and 7 are respectively enlarged views showing portions of the structures illustrated in Figs. 2, 3 and 4.

Referring more specifically to the drawings and more especially to Fig. 1, the beverage brewing device here shown for purposes of illustration consists of a boiling chamber 1 and an infusion chamber 2, which may be separated by a partition member 3. Such partition member may be the partition between the chambers of any form of plural chambered utensil, the brewing device being merely illustrative of one form of utensil to which the structure comprising my invention is applicable. The partition member 3 and the wall 4 of the infusion chamber only are shown in the subsequent figures, it being understood that such walls may be the corresponding portions of any utensil.

The fluid delivery means, as most clearly shown in Fig. 2, consists of a tubular guide member 5 secured in an aperture formed therefor in the wall 3. The tubular member 5 telescopically engages a fluid delivery tube 6 which has a circumferential flange 7 formed thereon adjacent one end and an aperture 8 in the wall thereof immediately above such flange. The member 6 is of sufficient length so that a portion 9 thereof extends upwardly and is telescopically engaged by the delivery conduit 10 secured to the wall 4.

The guide member 5 may have associated therewith a laterally projecting element 11 here shown in the form of a tubular member having a closed bottom 12. Co-axially mounted in the member 11 is a spring 13 and a ball 14, the action of the spring forcing the ball into engagement with the outer periphery of the fluid delivery element 6. In order that a positive adjustment of the member 6 with respect to the guide 5 may be obtained I may prefer to have the member 6 formed with a plurality of longitudinally spaced circumferential grooves 15 which will be engaged by the ball 14 and maintain proper adjustment of the fluid delivery means during the entire cooking or brewing process.

As illustrated in Fig. 3, I may prefer to omit the spring actuated ball, as illustrated in Figs. 2 and 5, and provide in lieu thereof as further illustrated in Fig. 6, slots 16 and 17 in the terminal portion of the member 5, which slots divide the wall of the guide so that the resilient portions 18 and 19 thereof will frictionally engage the outer periphery of the fluid delivery conduit 6. By so forming the terminal portion of the guide member 5 the normal diameter of the upper end of such guide can be reduced below the normal outside diameter of the tube 6 by bending inwardly the portions 18 and 19 so that upon insertion of the tube a resilient gripping action will be effected by the guide on such tube, maintaining the same in proper adjusted position.

A further modification of the guide member whereby the delivery tube 6 is maintained in proper adjusted position, is illustrated in Figs. 4 and 7 in which the guide member 5 has diametrically opposed slots formed in the wall thereof adapted to receive a spring clip 20. The spring clip 20 will have the normal distance between the inside faces of the members 21 and 22 less than the outside diameter of the tube 6 so that upon the insertion of such tube in the guide a proper gripping action will be effected by the spring clip 20 to maintain the tube in the adjusted position. In order to positively insure the proper adjustment of the tube 6, when engaged by the spring clip 20, such tube may again be formed with circumferential grooves 15, which will register with the inner faces of the portions 21 and 22 of the spring clip.

It will be noted in connection with the formation of the delivery tube 6 that by placing indicating ordinals on the outer periphery thereof, as illustrated in Fig. 3, the vertical adjustment of such tube will be automatically indicated to the operator for each setting thereof, which ordinals may be indicative of the quantity of fluid in cups or like measure which will be transferred from one chamber to another for the particular setting of the delivery tube.

In the operation of the described fluid delivery means the utensil of which such means is a part will have the boiling chamber thereof filled with water or a like fluid to a predetermined level and the operator will then effect the proper axial adjustment of the tube 6 with respect to the guide 5, depending upon the quantity of liquid which will be needed for the particular cooking or brewing operation. This adjustment can readily be made by simply grasping the upper portion 9 of the tube 6, the tube 10 having previously been removed, and by moving the tube 6 axially in either direction until the proper ordinal is visible above the upper end of the guide 5. For the selected setting of the tube 6 the operator will then be assured that the indicated quantity of liquid and no more and no less will be transferred from the boiling chamber to the brewing chamber during the subsequent operation. By the formation of the flange 7 immediately below the aperture 8, which is the point of ingress of the liquid into the delivery tube 6, the steam generated by the fluid in the boiling chamber will blow away from such aperture any liquid tending to enter the same after the liquid level in the boiling chamber has fallen to the horizontal plane of the flange 7. This construction positively defines the level to which the liquid is to be drawn off and insures a degree of accuracy in the quantity of liquid transferred which is desirable in all well regulated brewing or cooking operations.

The structure and modifications thereof comprising my invention are believed to present further advantages so familiar to those acquainted with the art that a further reiteration of these advantages is believed unnecessary. It will also be understood that the particular forms of construction chosen for purposes of illustrating the principles comprising my invention may be altered in several respects without deviating from such principles.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. In a utensil, the combination of a plurality of chambers, a partition between said chambers, means for delivering the contents of one of such chambers to another, said means having definitely spaced serrations and passing through the partition between such chambers, and means associated with such partition resiliently engaging said delivery means, and cooperating with said serrations to support said delivery means in any one of a plurality of selected positions defined by such serrations.

2. In a utensil, the combination with a plurality of chambers, of an externally serrated delivery means movably mounted in such utensil between said chambers for transferring the contents of one of said chambers to another, and resilient means engaging the serrations on said delivery means for maintaining the same in proper adjusted position.

3. In a utensil, the combination of a plurality of chambers separated by a partition, a serrated delivery conduit for transferring the contents of one of such chambers to another, means associated with the partition between such chambers movably engaging said delivery means, and resilient means associated with said engaging means adapted to engage the serrations on said delivery means for maintaining the same in proper adjusted position.

4. In a utensil, the combination of a plurality of chambers, fluid delivery means for transferring the contents of one of such chambers to another, guide means for movably engaging said delivery means, and a resiliently mounted ball carried by said guide means engaging said delivery means to support the same in any selected position.

5. In a utensil, the combination of a plurality of chambers, fluid delivery means having serrations on the periphery thereof for transferring the contents of one of such chambers to another, guide means for movably supporting said delivery means, and resilient means associated with said guide means adapted to engage the serrations on said delivery means.

6. In a utensil, the combination of a plurality of chambers, movable means for transferring the contents of one of said chambers to another, means for movably supporting said delivery means, and a spring clip associated with said supporting means resiliently engaging said delivery means.

7. In a utensil, the combination of a plurality of chambers, tubular fluid conducting means for transferring the contents of one of such chambers to the other, tubular guide means for said fluid conducting means, and spring clip means for maintaining adjustable relation between said conducting means and said guide means.

8. In a utensil, the combination of a plurality of chambers, fluid conducting means for transferring the contents of one of such chambers to another, axially spaced serrations on the outer periphery of said fluid conducting means, guide means movably supporting said conducting means, and resilient means associated with said guide means adapted to engage said serrations on the periphery of said conducting means.

9. In a utensil, the combination of a plurality of chambers, a partition between such chambers, tubular fluid conducting means for transferring the contents of one of such chambers to another, tubular guide means associated with said partition and movably supporting said conducting means, serrations on the periphery of said conducting means, and spring clip means associated with said guide means maintaining said conducting means in proper selected position.

Signed by me this 4th day of April, 1930.

STACEY A. HAINES.